(12) United States Patent
Shin et al.

(10) Patent No.: US 6,876,840 B2
(45) Date of Patent: Apr. 5, 2005

(54) TRIPLEXER AND MULTILAYERED STRUCTURE THEREOF

(75) Inventors: Yu Seon Shin, Seoul (KR); Seung Hyun Ra, Seongnam-si (KR); Chang Yong Lee, Seongnam-si (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 441 days.

(21) Appl. No.: 10/196,271

(22) Filed: Jul. 17, 2002

(65) Prior Publication Data

US 2003/0124984 A1 Jul. 3, 2003

(30) Foreign Application Priority Data

Dec. 27, 2001 (KR) ........................................ 2001-86418

(51) Int. Cl.[7] ................................................. H04B 1/18
(52) U.S. Cl. ...................... 455/280; 455/311; 455/323; 333/132; 333/134
(58) Field of Search ................................ 455/280, 293, 455/303, 305, 307, 308, 311, 312, 316, 334, 339, 75, 136, 164.1, 168.1, 192.1, 208

(56) References Cited

U.S. PATENT DOCUMENTS 5,339,284 A * 8/1994 Kaiser ........................ 367/103
5,564,076 A * 10/1996 Auvray ......................... 455/76
6,411,178 B1 * 6/2002 Matsumura et al. ........ 333/134
6,470,191 B1 * 10/2002 Nielsen et al. ........... 455/552.1

* cited by examiner

Primary Examiner—Edward F. Urban
Assistant Examiner—Thuan T. Nguyen
(74) Attorney, Agent, or Firm—Lowe Hauptman & Berner, LLP (57) ABSTRACT

A triplexer and a multilayered structure thereof. The triplexer comprises a first filter circuit and a low pass filter circuit connected in parallel to an input terminal, and a second filter circuit and a third filter circuit connected in parallel to an output terminal of the low pass filter circuit. The first filter circuit passes a signal of a first frequency band, and the low pass filter circuit passes a signal of a predetermined frequency band which is lower than the first frequency band. The second filter circuit extracts a signal of a second frequency band from the predetermined frequency band signal, and the third filter circuit extracts a signal of a third frequency band from the predetermined frequency band signal, which third frequency band is lower than the second frequency band. The low pass filter circuit includes a notch circuit for extending a portion of the predetermined frequency band, neighboring the first frequency band. According to the invention, the triplexer can separate an input signal received at the input terminal into the signals of the first, second and third frequency bands.

14 Claims, 6 Drawing Sheets

PRIOR ART

FIG. 1a

PRIOR ART

TRIPLEXER AND MULTILAYERED STRUCTURE THEREOF

BACKGROUND OF THE INVENTION

1. Field of the Invention

The present invention relates to a triplexer, and more particularly to a triplexer for separating an input signal into signals of three different frequency bands, and a multilayered structure thereof.

2. Description of the Related Art

Recently, mobile telecommunications systems have comprised more complex functions to meet a variety of requirements of consumers. Also, mobile terminals have had simpler and smaller components installed therein so as to be convenient to carry. One such conventional mobile terminal is a dual-band terminal that can process signals of two frequency bands together. Such a dual-band mobile terminal typically comprises a multilayered diplexer for receiving signals of two different frequency bands simultaneously through one antenna and separating the received signals from each other.

In the dual-band mobile terminal, the multilayered diplexer is generally adapted to receive signals of two different frequency bands, for example, a code division multiplex access (CDMA) frequency band (about 824–894 MHz) and a personal communication service (PCS) frequency band (about 1850–1990 MHz) at one input terminal and branch the received signals respectively to two output terminals. The multilayered diplexer has a laminated structure of a plurality of dielectric layers having conductive patterns of high and low pass filters formed thereon. Through the laminated structure, the multilayered diplexer acts to separate an input signal received through one antenna into signals of respective frequency bands and provide the separated signals respectively to frequency processing circuits associated with the respective frequency bands and disposed at the subsequent stage.

Furthermore, a global positioning system (GPS) function has recently been additionally provided in mobile terminals, resulting in a need for a triple-band system to separately process signals of three frequency bands (for example, f1=824–894 MHz, f2=1560–1580 MHz and f3=1850–1990 MHz).

For implementation of the triple-band system, conventional mobile terminals have further comprised a separate antenna in addition to an existing antenna, or another high pass filter provided between the existing antenna and a diplexer.

A detailed description will hereinafter be given of two types of triple-band systems employed in conventional mobile terminals.

Figure 1A:
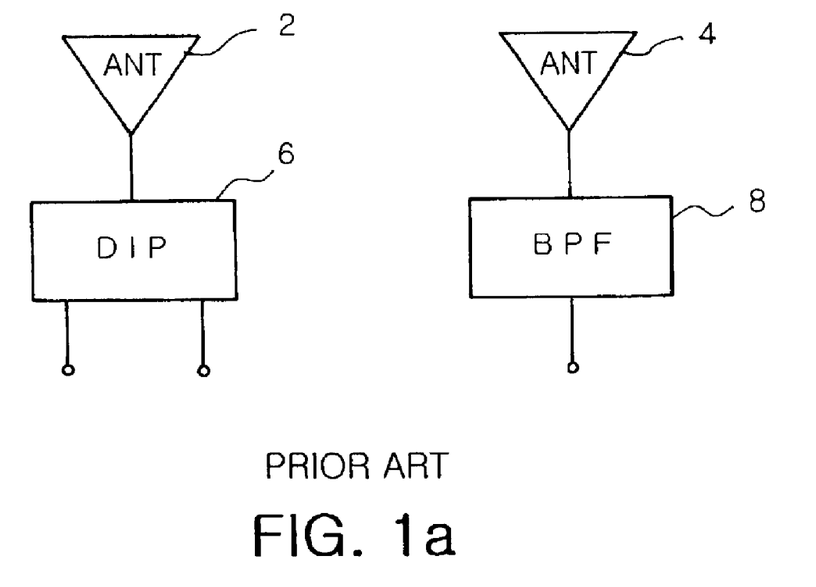
FIGS. 1a and 1b are block diagrams of triple-band systems of conventional mobile terminals.
Figure 1B:
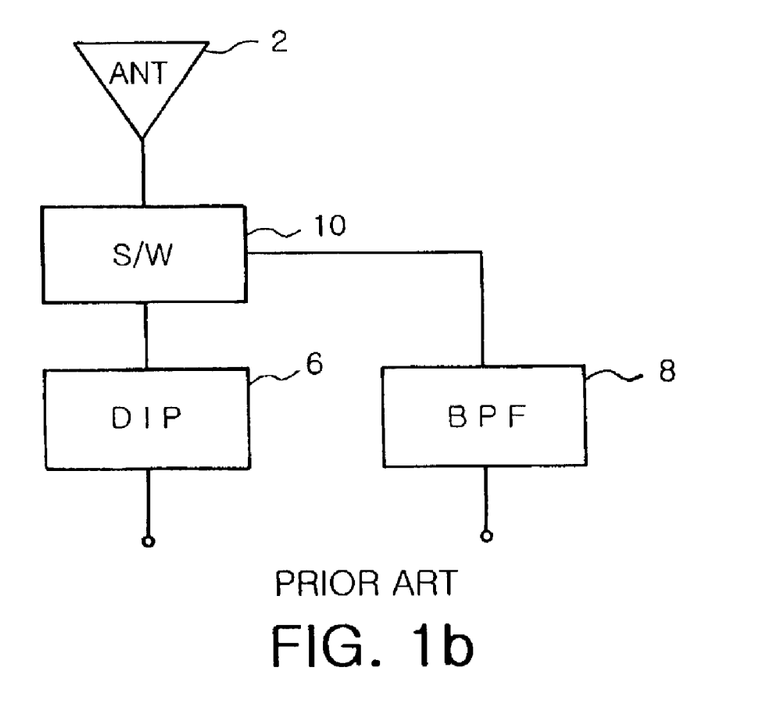

FIGS. 1a and 1b are block diagrams of triple-band systems of conventional mobile terminals. With reference to FIG. 1a, one conventional mobile terminal comprises an existing antenna 2 for receiving signals of the f1 and f3 bands, and a separate antenna 4 for receiving a signal of the additional f2 band. The f1 and f3 band signals received at the existing antenna 2 are separated from each other by a typical diplexer 6. The f2 band signal received at the separate antenna 4 is processed through a band pass filter 8 associated with the f2 band.

Alternatively, as shown in FIG. 1b, in the other conventional mobile terminal, the existing antenna 2 functions to receive the f2 band signal as well as the f1 and f3 band signals, without employing the separate antenna. Further, the f2 or f3 band signal is separately extracted from among the received signals.

However, the above-described triple-band systems of the conventional mobile terminals have a disadvantage in that separate components must be additionally installed in the mobile terminals, resulting in an increase in cost and difficulties in realizing smallness and lightness of the terminals.

Moreover, in the case where the f2 frequency band is present between the f1 frequency band and the f3 frequency band, particularly adjacent to any one, for example, f3 of them, a signal of the f3 frequency band must be accurately branched off from the adjacent frequency band. However, it is hard to implement a unitary circuitry capable of accurately branching the signal of the f3 frequency band off from the adjacent frequency band, and such a circuitry has also not been proposed up to the present.

SUMMARY OF THE INVENTION

Therefore, the present invention has been made in view of the above problems, and it is an object of the present invention to provide a triplexer which has a branching characteristic capable of accurately branching signals of three frequency bands received at one input terminal to different output terminals.

It is another object of the present invention to provide a multilayered triplexer structure which is capable of separating an input signal received at one antenna into signals of three frequency bands with high performance and being so miniaturized as to be appropriately installed in a mobile terminal.

In accordance with one aspect of the present invention, the above and other objects can be accomplished by the provision of a triplexer for separating an input signal received at an input terminal into signals of first, second and third frequency bands, comprising: a first filter circuit having its one terminal connected to the input terminal, the first filter circuit passing the first frequency band signal; a low pass filter circuit having its one terminal connected to the input terminal, the low pass filter circuit passing a signal of a predetermined frequency band, the predetermined frequency band being lower than the first frequency band; a second filter circuit having its one terminal connected to the other terminal of the low pass filter circuit, the second filter circuit extracting the second frequency band signal from the predetermined frequency band signal; a third filter circuit having its one terminal connected to the other terminal of the low pass filter circuit, the third filter circuit extracting the third frequency band signal from the predetermined frequency band signal, the third frequency band being lower than the second frequency band; and first, second and third output terminals provided respectively at the other terminals of the first, second and third filter circuits for outputting the first, second and third frequency band signals; the low pass filter circuit including a notch circuit for extending a portion of the predetermined frequency band, neighboring the first frequency band.

Preferably, at least one of the first filter circuit and second filter circuit may include: first and second capacitors connected in series; a third capacitor having its one terminal connected between the first and second capacitors; and a first inductor having its one terminal connected to the other terminal of the third capacitor and its other terminal connected to ground. At least one of the low pass filter circuit and third filter circuit may include: a parallel circuit, the parallel circuit consisting of a fourth capacitor and a second inductor connected in parallel; and a fifth capacitor having its one terminal connected to an output terminal of the parallel circuit and its other terminal connected to the ground. More preferably, all the first to third filter circuits and the low pass filter circuit may have the same construction, which is any one of the above-described constructions.

Preferably, the notch circuit may include a third inductor connected in series between the output terminal of the parallel circuit of the low pass filter circuit and the one terminal of the fifth capacitor for extending the portion of the predetermined frequency band, neighboring the first frequency band.

In accordance with another aspect of the present invention, there is provided a multilayered triplexer structure which includes a plurality of dielectric layers having conductive patterns formed thereon to separate an input signal received at an input terminal into signals of first, second and third frequency bands, the multilayered triplexer structure comprising: a first filter circuit, the first filter circuit including first and second capacitors connected in series to the input terminal, a third capacitor connected between the first and second capacitors, and a first inductor having its one terminal connected to the third capacitor and its other terminal connected to ground; a low pass filter circuit, the low pass filter circuit including a first parallel circuit having its one terminal connected to the input terminal, the first parallel circuit consisting of a fourth capacitor and a second inductor connected in parallel, a third inductor having its one terminal connected to the other terminal of the first parallel circuit, and a fifth capacitor having its one terminal connected to the other terminal of the third inductor and its other terminal connected to the ground; a second filter circuit, the second filter circuit including sixth and seventh capacitors connected in series to the other terminal of the first parallel circuit of the low pass filter circuit, an eighth capacitor connected between the sixth and seventh capacitors, and a fourth inductor having its one terminal connected to the eighth capacitor and its other terminal connected to the ground; and a third filter circuit, the third filter circuit including a second parallel circuit having its one terminal connected to the other terminal of the first parallel circuit of the low pass filter circuit, the second parallel circuit consisting of a ninth capacitor and a fifth inductor connected in parallel, and a tenth capacitor having its one terminal connected to the other terminal of the second parallel circuit and its other terminal connected to the ground.

Preferably, the multilayered triplexer structure may further include a dielectric layer having a conductive pattern formed thereon to constitute a surface-mounted antenna. The multilayered triplexer structure may further comprise first to third output terminals and at least one ground terminal formed on corresponding ones of the dielectric layers in a laminated direction of the corresponding dielectric layers in such a manner that they extend to edges of the corresponding dielectric layers, the first output terminal being connected to the first filter circuit, the second output terminal being connected to the second filter circuit, the third output terminal being connected to the third filter circuit.

Preferably, the plurality of dielectric layers may be a first dielectric layer having a pattern of the ground formed thereon, a second dielectric layer having patterns of the fifth and tenth capacitors formed thereon, a third dielectric layer having patterns of the first to fifth inductors formed thereon, and a fourth dielectric layer having patterns of the first to fourth capacitors and patterns of the sixth to ninth capacitors formed thereon, the first to fourth dielectric layers being laminated upwardly in order.

More preferably, the third dielectric layer or fourth dielectric layer may include a plurality of dielectric layers, at least one of the inductors having patterns formed on at least two of the dielectric layers of the third dielectric layer and interconnected by way of a viahole. Further, at least one of the third and fourth dielectric layers may have capacitor and inductor patterns formed together thereon.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
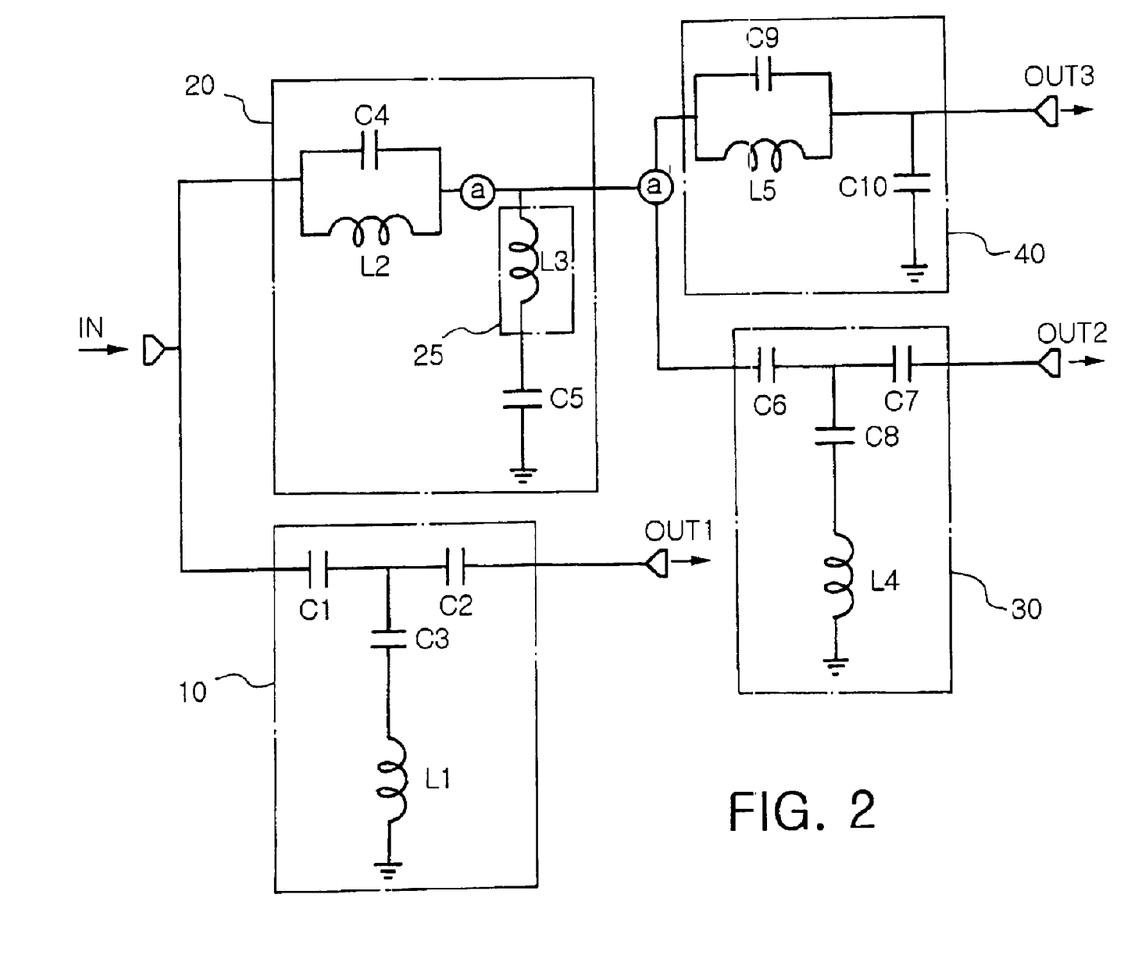
FIG. 2 is a circuit diagram showing an equivalent circuit of a triplexer in accordance with a preferred embodiment of the present invention.

FIG. 2 is a circuit diagram showing an equivalent circuit of a triplexer in accordance with a preferred embodiment of the present invention.

As shown in FIG. 2, the triplexer basically comprises a first filter circuit 10 having its one terminal connected to an input terminal IN, a low pass filter circuit 20 having its one terminal connected to the input terminal IN in parallel with the one terminal of the first filter circuit 10, a notch circuit 25 included in the low pass filter circuit 20, a second filter circuit 30 having its one terminal connected to the other terminal of the low pass filter circuit 20, and a third filter circuit 40 having its one terminal connected to the other terminal of the low pass filter circuit 20 in parallel with the one terminal of the second filter circuit 30. First, second and third output terminals OUT1, OUT2 and OUT3 are provided respectively at the other terminals of the first, second and third filter circuits 10, 30 and 40.

In more detail, the first filter circuit 10 includes two capacitors C1 and C2 connected in series, a capacitor C3 having its one terminal connected between the capacitors C1 and C2, and an inductor L1 having its one terminal connected to the other terminal of the capacitor C3 and its other terminal connected to ground. The low pass filter circuit 20 includes a parallel circuit consisting of a capacitor C4 and an inductor L2 connected in parallel, and a capacitor C5 having its one terminal connected to an output terminal of the parallel circuit and its other terminal connected to the ground. The second filter circuit 30 includes three capacitors C6, C7 and C8 connected in a T-shaped form in the same manner as the capacitors C1, C2 and C3 of the first filter circuit 10, and an inductor L4 connected between the capacitor C8 and the ground. The third filter circuit 40 has the same structure as that of the low pass filter circuit 20. Namely, the third filter circuit 40 includes a parallel circuit consisting of a capacitor C9 and an inductor L5 connected in parallel, and a capacitor C10 having its one terminal connected to an output terminal of the parallel circuit and its other terminal connected to the ground.

In the equivalent circuit of the triplexer constructed as described above, the first and second filter circuits 10 and 30 act as high pass filters for attenuating different desired frequency band signals to pass only high frequency band components, and the third filter circuit 40 acts as a low pass filter for attenuating a desired frequency band signal to pass only low frequency band components, in a similar manner to the low pass filter circuit 20.

In particular, the low pass filter circuit 20 further includes the notch circuit 25, which is composed of an inductor L3. The notch circuit 25 acts to increase an insertion loss of a specific frequency to extend a portion of an output signal frequency band of the low pass filter circuit, neighboring an output signal frequency band of the first filter circuit, so as to improve a branching characteristic. The accurate branching by the first filter circuit 10 and low pass filter circuit 20 can reduce the influence of insertion losses on a frequency band at which the second filter circuit 30 passes an output signal from the low pass filter circuit 20.

The operation of the triplexer with the equivalent circuit of FIG. 2 will hereinafter be described in more detail with reference to FIGS. 3a and 3b, which are graphs illustrating insertion loss characteristics of the equivalent circuit of FIG. 2.

Figure 3A:
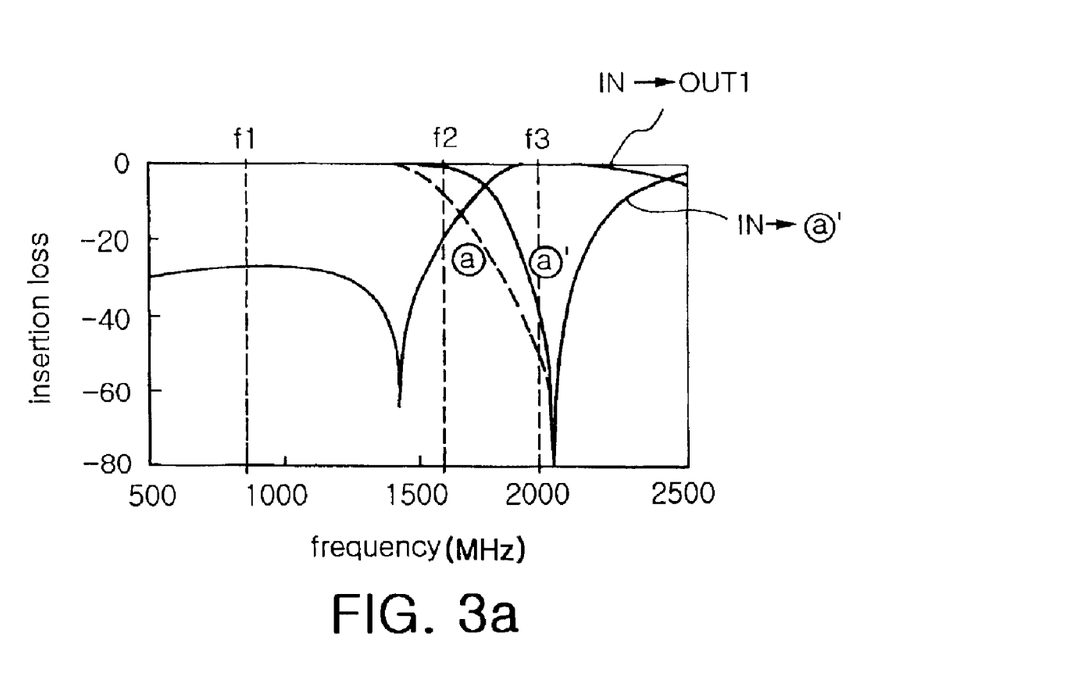
FIGS. 3a and 3b are graphs illustrating insertion loss characteristics of the triplexer of FIG. 2.
Figure 3B:
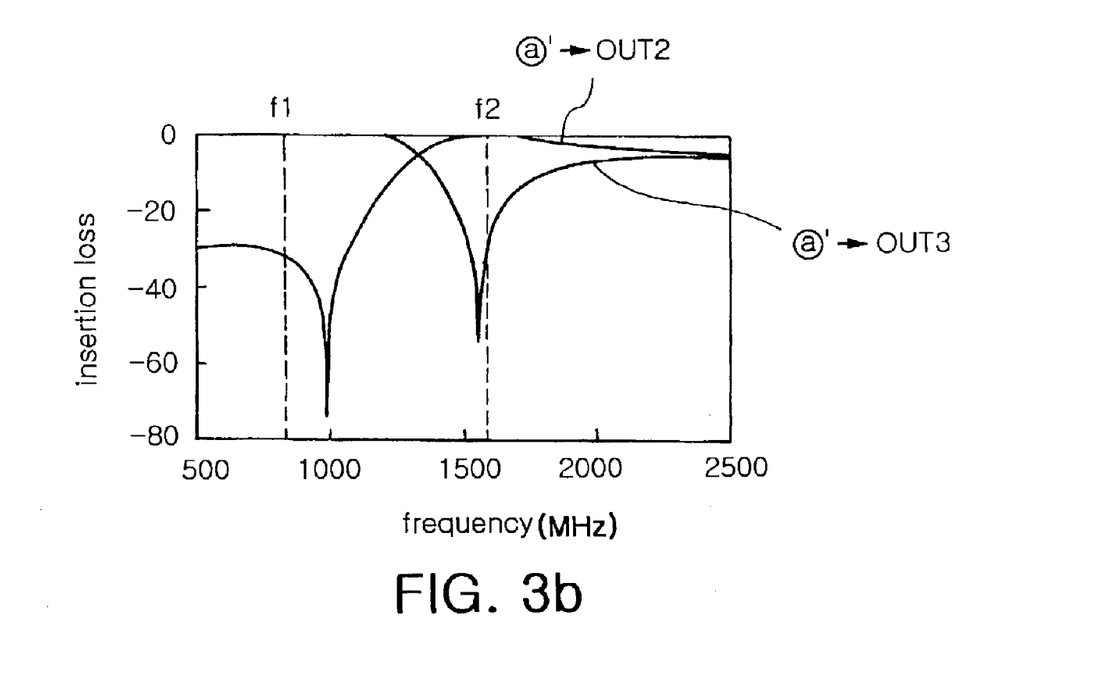

FIGS. 3a and 3b show the results of an example of the triplexer implemented to separate one signal into signals of three frequency bands, f1 (824–894 MHz) corresponding to CDMA, f2 (1560–1580 MHz) corresponding to GPS and f3 (1850–1990 MHz) corresponding to AMPS (Advanced Mobile Phone Service). For implementation of such a triplexer, the elements in the equivalent circuit of FIG. 2 have values selected as follows: C1=0.58 pF, C2=0.8 pF, C3=1.04 pF, C4=3.28 pF, C5=0.66 pF, C6=1.3 pF, C7=1.01 pF, C8=2.72 pF, C9=2.96 pF, C10=1.76 pF, L1=12.04 nH, L2=1.93 nH, L3=7.2 nH, L4=9.64 nH and L5=3.53 nH.

FIG. 3a represents insertion loss characteristics of the first filter circuit 10 and low pass filter circuit 20, and FIG. 3b represents insertion loss characteristics of the second and third filter circuits 30 and 40.

With reference to FIG. 3a, an input signal from the input terminal IN is fed to the first filter circuit 10 and the low pass filter circuit 20. The first filter circuit 10 passes only high frequency band components corresponding to f3 (IN→OUT1) by setting the maximum value of an insertion loss of a signal corresponding to about 1300 MHz to about 60 dB. Alternatively, the low pass filter circuit 20 passes only low frequency band components (IN→(a)') by increasing an insertion loss of a signal corresponding to f3 to about 80 dB. It should be noted here that the low pass filter circuit 20 covers both the f1 and f2 frequency bands.

Particularly, for the purpose of sufficiently securing the f2 frequency band, the low pass filter circuit 20 further includes the notch circuit 25 provided with the inductor L3 connected in series to the capacitor C5. The notch circuit 25 functions to change a gentle slope of an insertion loss characteristic at its input terminal (a), which attenuates even f2 frequency band components by a certain degree, to a steep slope ((a)→(a)'), so as to stably secure the f2 frequency band. In other words, the notch circuit 25 makes an insertion loss at the output terminal (a)' of the low pass filter circuit 20 greater than that based on the parallel circuit of the capacitor C4 and inductor L2 (this is also a kind of notch circuit), thus changing the insertion loss characteristic from a gentle slope as indicated by a dotted line in FIG. 3a to a steep slope as indicated by a solid line in FIG. 3a ((a)→(a)'). As a result, the low pass filter circuit 20 can provide its output signal more stably containing frequency band components corresponding to f2.

Thereafter, the output signal from the low pass filter circuit 20 is applied to the second filter circuit 30 and the third filter circuit 40. The second filter circuit 30 passes only high frequency band components corresponding to f2 ((a)'→OUT2) by setting the maximum value of an insertion loss at 1000 MHz neighboring f1 to about 80 dB. Alternatively, the third filter circuit 40 passes only low frequency band components corresponding to f1 ((a)'→OUT3) by setting the maximum value of an insertion loss at 1550 MHz neighboring f2 to about 50 dB.

Accordingly, the first filter circuit 10 provides a frequency band signal corresponding to f3 to the first output terminal OUT1, the second filter circuit 30 provides a frequency band signal corresponding to f2 to the second output terminal OUT2, and the third filter circuit 40 provides a frequency band signal corresponding to f1 to the third output terminal OUT3. Consequently, the present invention provides a unitary triplexer module capable of separating an input signal received at one input terminal into signals of three frequency bands, thereby readily realizing a triple-band mobile terminal.

For realization of the triple-band mobile terminal, the present invention further provides a triplexer structure appropriate to the mobile terminal as a part thereof. The triplexer is generally required to have such a small size as to be properly installed in the mobile terminal. In order to meet such a miniaturization requirement, according to the present invention, the triplexer has a laminated structure of a plurality of dielectric layers with conductive patterns of the triplexer circuit formed thereon.

Figure 4A:
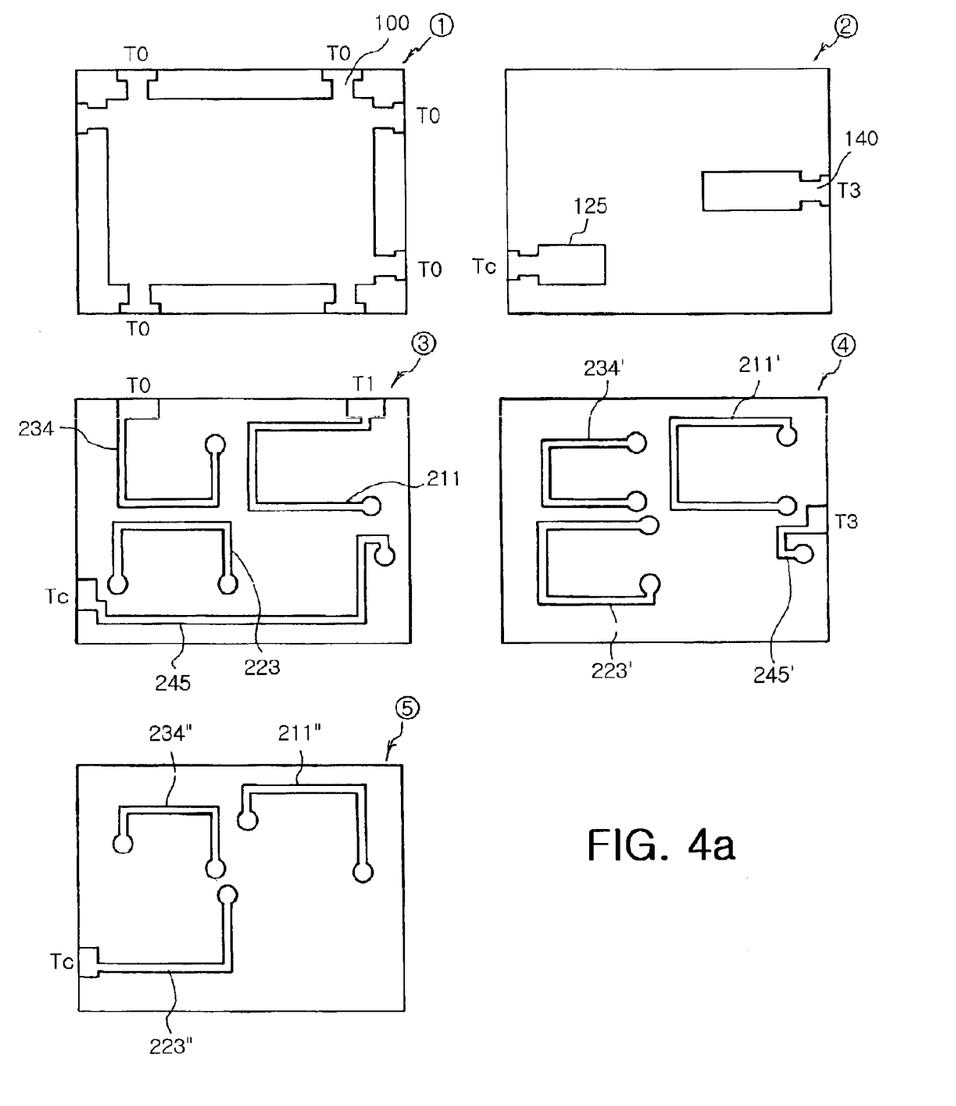
FIGS. 4a and 4b are schematic diagrams of dielectric layers constituting a multilayered structure of the triplexer of FIG. 2.
Figure 4B:
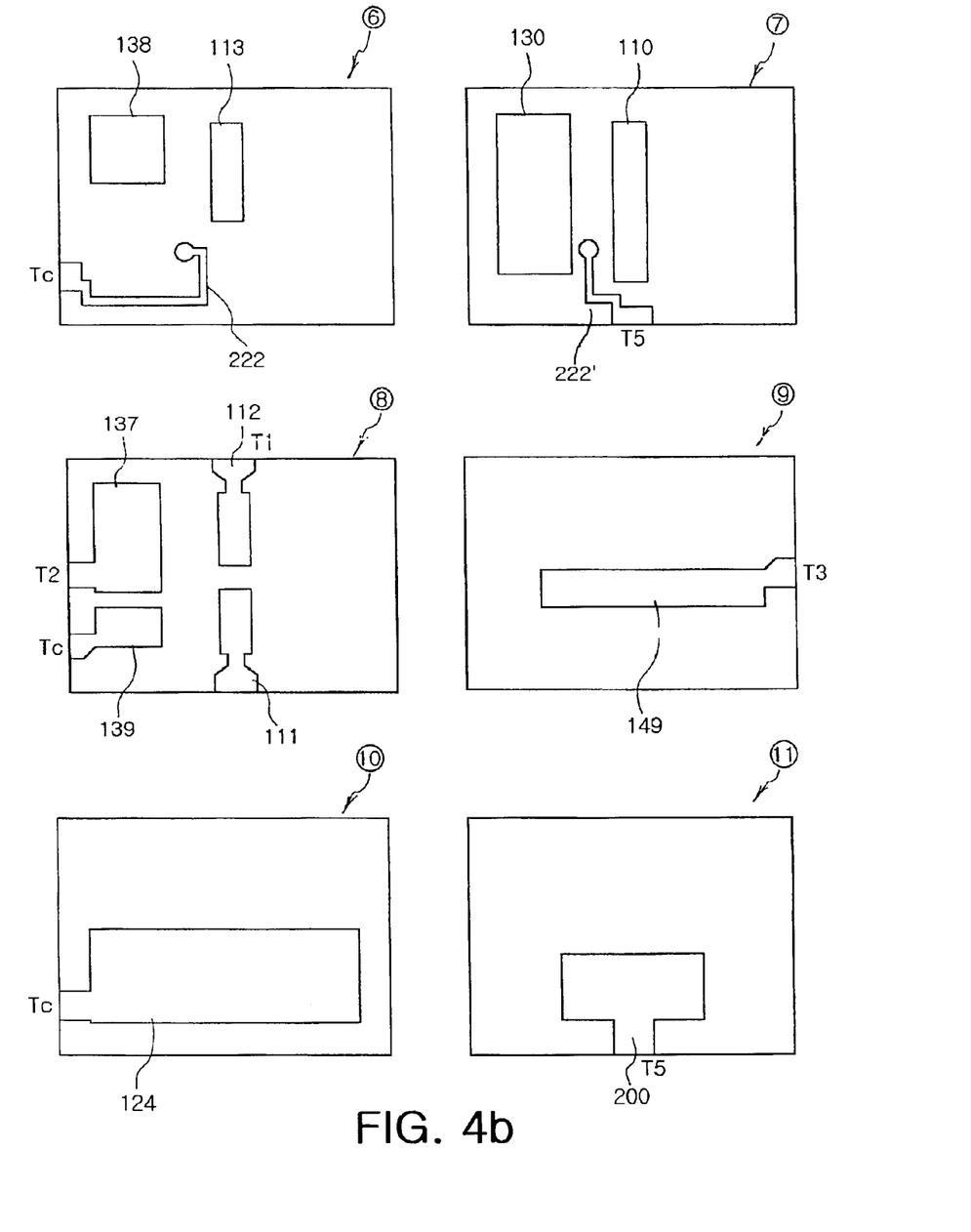

FIGS. 4a and 4b are schematic diagrams of dielectric layers constituting a multilayered structure of the triplexer having the equivalent circuit of FIG. 2.

As shown in FIGS. 4a and 4b, the multilayered triplexer structure comprises eleven dielectric layers ① to ⑪. A ground pattern 100 is formed on the first dielectric layer ①. Formed on the second dielectric layer ② are patterns 125 and 140 of the grounded capacitor C5 and capacitor C10 in the low pass filter circuit 20 and third filter circuit 40. Patterns 211, 222, 223, 234 and 245 of the inductors L1, L2, L3, L4 and L5 are formed on the third to seventh dielectric layers ③ to ⑦. Formed on the sixth to tenth dielectric layers ⑥ to ⑩ are patterns 111, 112, 113, 124, 137, 138, 139 and 149 of the capacitors C1, C2, C3 and C4 and capacitors C6, C7, C8 and C9 and dummy patterns 110 and 130 of the capacitors C1 and C2 and capacitors C6 and C7. The first to tenth dielectric layers ① to ⑩ are laminated upwardly in order.

In the present embodiment, for optimization of conductive patterns for miniaturization of the triplexer, the patterns 222 and 222' of the inductor L2 may be formed respectively on the sixth and seventh dielectric layers along with the patterns 113 and 138 of the capacitors C3 and C8 and the dummy patterns 110 and 130, as shown in FIG. 4b. Also, the eleventh dielectric layer ⑪ may be additionally provided on which a conductive pattern 200 is formed to constitute an antenna connected to an input terminal T5.

In more detail, formed on the first dielectric layer ① is the ground (electrode) pattern 100, which includes seven ground terminals T0 extending to the edge of the first dielectric layer ①. The patterns 125 and 140 of the capacitors C5 and C10 connected respectively to the ground terminals T0 are formed on the second dielectric layer ②, and the patterns of the inductors included in the respective filter circuits are formed on the third to seventh dielectric layers ③ to ⑦. On the third to seventh dielectric layers, the inductor patterns are formed to have certain lengths proper to their inductances. The inductor patterns are formed separately on the respective layers and then interconnected via viaholes, so that they can have desired lengths at a limited area to achieve the miniaturization of the triplexer.

In the present embodiment, the patterns of the inductors L3, L4 and L5 provided on the third dielectric layer ③ are interconnected by way of viaholes and then extend to the fourth or fifth dielectric layer ④ or ⑤, so as to have desired inductances. The patterns of the grounded inductors L1 and L4 of the first filter circuit 10 and second filter circuit 30 are formed on the third dielectric layer in such a manner that they extend to the edge of the third dielectric layer to be connected respectively to the ground terminals T0. The patterns 245 and 245' of the inductor L5 of the third filter circuit 40 are provided respectively on the third and fourth dielectric layers in such a manner that they extend to the edges of the third and fourth dielectric layers so as to be connected to the output terminal ⓐ' of the low pass filter circuit 20 and the third output terminal OUT3. The patterns 223, 223' and 223" of the inductor L3 constituting the notch circuit 25 are formed on the fifth dielectric layer. Among them, the pattern 223" extends to the edge of the fifth dielectric layer to be connected to the output terminal ⓐ' of the low pass filter circuit 20.

On the other hand, the patterns 222 and 222' of the inductor L2 of the low pass filter circuit 20 are provided respectively on the sixth and seventh dielectric layers together with other capacitor patterns 113 and 138 and dummy patterns 110 and 130 in such a way that they extend to the edges of the sixth and seventh dielectric layers so as to be connected to the output terminal ⓐ' of the low pass filter circuit 20 and the input terminal IN.

Formed on the sixth to tenth dielectric layers are the patterns of the capacitors C1 to C4 and C6 to C9, except for the patterns formed on the second dielectric layer. Provided on the sixth dielectric layer are the patterns 113 and 138 of the capacitors C3 and C8 connected in series, respectively, to the inductors L1 and L4 of the first filter circuit 10 and second filter circuit 30. Formed on the eighth dielectric layer are the patterns 111 and 112 of the series-connected capacitors C1 and C2 of the first filter circuit 10 and the patterns 137 and 139 of the series-connected capacitors C6 and C7 of the second filter circuit 30. These patterns 111, 112 and 137 and 139 extend to the edge of the eighth dielectric layer so as to be connected to associated terminals T1, T5, Tc and T2, respectively.

Respectively formed on the ninth and tenth dielectric layers are the patterns 124 and 149 of the capacitors C4 and C9 connected in parallel, respectively, to the inductors L2 and L5 of the low pass filter circuit 20 and third filter circuit 40. These patterns 124 and 149 extend respectively to the edges of the ninth and tenth dielectric layers to be connected to associated terminals Tc and T3.

More preferably, the antenna pattern 200 to be connected to the input terminal IN of the triplexer is additionally formed on the eleventh dielectric layer, which is then laminated as a top layer.

Figure 5:
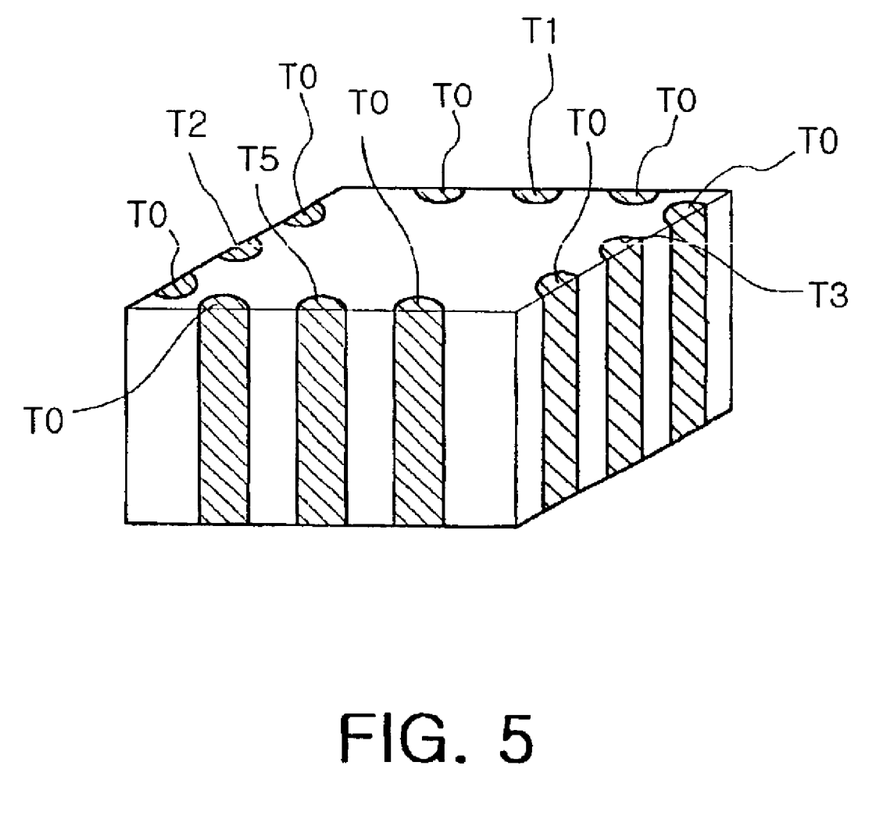
FIG. 5 is a schematic perspective view of the multilayered triplexer structure composed of the dielectric layers in FIGS. 4a and 4b.

FIG. 5 is a schematic view of the multilayered triplexer structure composed of the dielectric layers in FIGS. 4a and 4b. As seen from FIG. 5, the side terminals T0, T1, T2, T3, T5 and Tc are formed to interconnect the patterns extending to the edges of the dielectric layers, at the interlayer boundaries. These side terminals T0, T1, T2, T3, T5 and Tc correspond respectively to the ground, first output terminal OUT1, second output terminal OUT2, third output terminal OUT3, input terminal IN and low pass filter circuit output terminal ⓐ', and have been disclosed along with them with reference to FIGS. 4a and 4b.

Those skilled in the art will understand that the triplexer can be easily manufactured with the multilayered structure having the dielectric layers as described above. For example, each dielectric layer is provided with a sheet of dielectric material. The patterns as shown in FIGS. 4a and 4b are formed on the corresponding sheets in a typical printed circuit pattern forming manner. The resulting dielectric layers are then laminated and sintered. Thereafter, the external electrodes as shown in FIG. 5 are formed on the resulting dielectric layers to interconnect the terminals extending to the edges of the layers.

As apparent from the above description, the present invention provides a triplexer which has a branching characteristic capable of accurately separating an input signal received through one antenna into signals of three frequency bands, and a multilayered triplexer structure which is capable of being so miniaturized as to be appropriately installed in a mobile terminal. For miniaturization of the triplexer, the multilayered triplexer structure has a plurality of laminated dielectric layers with conductive patterns formed thereon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A triplexer for separating an input signal received at an input terminal into signals of first, second and third frequency bands, comprising:

a first filter circuit having its one terminal connected to said input terminal, said first filter circuit passing said first frequency band signal;

a low pass filter circuit having its one terminal connected to said input terminal, said low pass filter circuit passing a signal of a predetermined frequency band, said predetermined frequency band being lower than said first frequency band;

a second filter circuit having its one terminal connected to the other terminal of said low pass filter circuit, said second filter circuit extracting said second frequency band signal from said predetermined frequency band signal;

a third filter circuit having its one terminal connected to said other terminal of said low pass filter circuit, said third filter circuit extracting said third frequency band signal from said predetermined frequency band signal, said third frequency band being lower than said second frequency band; and first, second and third output terminals provided respectively at the other terminals of said first, second and third filter circuits for outputting said first, second and third frequency band signals;

said low pass filter circuit including a notch circuit for extending a portion of said predetermined frequency band, neighboring said first frequency band.

2. The triplexer as set forth in claim 1, wherein at least one of said first filter circuit and second filter circuit includes:

first and second capacitors connected in series;

a third capacitor having its one terminal connected between said first and second capacitors; and an inductor having its one terminal connected to the other terminal of said third capacitor and its other terminal connected to ground.

3. The triplexer as set forth in claim 1, wherein said third filter circuit includes:

a parallel circuit, said parallel circuit consisting of a first capacitor and an inductor connected in parallel; and a second capacitor having its one terminal connected to an output terminal of said parallel circuit and its other terminal connected to ground.

4. The triplexer as set forth in claim 1, wherein said low pass filter circuit includes:

a parallel circuit, said parallel circuit consisting of a first capacitor and a first inductor connected in parallel; and a second capacitor having its one terminal connected to an output terminal of said parallel circuit and its other terminal connected to ground;

said notch circuit being connected between said output terminal of said parallel circuit and said one terminal of said second capacitor to extend said portion of said predetermined frequency band, neighboring said first frequency band.

5. The triplexer as set forth in claim 4, wherein said notch circuit includes at least one second inductor.

6. The triplexer as set forth in claim 1, wherein said input terminal is connected to one antenna.

7. The triplexer as set forth in claim 1, wherein said first frequency band is about 1850–1990 MHz, said second frequency band is about 1560–1580 MHz and said third frequency band is about 824–894 MHz.

8. A multilayered triplexer structure which includes a plurality of dielectric layers having conductive patterns formed thereon to separate an input signal received at an input terminal into signals of first, second and third frequency bands, said multilayered triplexer structure comprising:

a first filter circuit, said first filter circuit including first and second capacitors connected in series to said input terminal, a third capacitor connected between said first and second capacitors, and a first inductor having its one terminal connected to said third capacitor and its other terminal connected to ground;

a low pass filter circuit, said low pass filter circuit including a first parallel circuit having its one terminal connected to said input terminal, said first parallel circuit consisting of a fourth capacitor and a second inductor connected in parallel, a third inductor having its one terminal connected to the other terminal of said first parallel circuit, and a fifth capacitor having its one terminal connected to the other terminal of said third inductor and its other terminal connected to said ground;

a second filter circuit, said second filter circuit including sixth and seventh capacitors connected in series to said other terminal of said first parallel circuit of said low pass filter circuit, an eighth capacitor connected between said sixth and seventh capacitors, and a fourth inductor having its one terminal connected to said eighth capacitor and its other terminal connected to said ground; and a third filter circuit, said third filter circuit including a second parallel circuit having its one terminal connected to said other terminal of said first parallel circuit of said low pass filter circuit, said second parallel circuit consisting of a ninth capacitor and a fifth inductor connected in parallel, and a tenth capacitor having its one terminal connected to the other terminal of said second parallel circuit and its other terminal connected to said ground.

9. The multilayered triplexer structure as set forth in claim 8, further including a dielectric layer having a conductive pattern formed thereon to constitute a surface-mounted antenna.

10. The multilayered triplexer structure as set forth in claim 8, further comprising first to third output terminals and at least one ground terminal formed on corresponding ones of said dielectric layers in a laminated direction of said corresponding dielectric layers in such a manner that they extend to edges of said corresponding dielectric layers, said first output terminal being connected to said first filter circuit, said second output terminal being connected to said second filter circuit, said third output terminal being connected to said third filter circuit.

11. The multilayered triplexer structure as set forth in claim 8, wherein said plurality of dielectric layers are a first dielectric layer having a pattern of said ground formed thereon, a second dielectric layer having patterns of said fifth and tenth capacitors formed thereon, a third dielectric layer having patterns of said first to fifth inductors formed thereon, and a fourth dielectric layer having patterns of said first to fourth capacitors and patterns of said sixth to ninth capacitors formed thereon, said first to fourth dielectric layers being laminated upwardly in order.

12. The multilayered triplexer structure as set forth in claim 11, wherein said third dielectric layer includes a plurality of dielectric layers, at least one of said inductors having patterns formed on at least two of said dielectric layers of said third dielectric layer and interconnected by way of a viahole.

13. The multilayered triplexer structure as set forth in claim 11, wherein said fourth dielectric layer includes a plurality of dielectric layers.

14. The multilayered triplexer structure as set forth in claim 11, wherein at least one of said third and fourth dielectric layers has capacitor and inductor patterns formed together thereon.

* * * * *